United States Patent
Hand

(10) Patent No.: US 12,245,097 B2
(45) Date of Patent: Mar. 4, 2025

(54) SYSTEMS AND METHODS FOR VIRTUAL AND AUGMENTED REALITY

(71) Applicant: Magic Leap, Inc., Plantation, FL (US)

(72) Inventor: Randall E. Hand, Parkland, FL (US)

(73) Assignee: Magic Leap, Inc., Plantation, FL (US)

( * ) Notice: Subject to any disclaimer, the term of this patent is extended or adjusted under 35 U.S.C. 154(b) by 282 days.

(21) Appl. No.: 17/598,207

(22) PCT Filed: Mar. 25, 2020

(86) PCT No.: PCT/US2020/024755
§ 371 (c)(1),
(2) Date: Sep. 24, 2021

(87) PCT Pub. No.: WO2020/198385
PCT Pub. Date: Oct. 1, 2020

(65) Prior Publication Data
US 2022/0191645 A1    Jun. 16, 2022

Related U.S. Application Data

(60) Provisional application No. 62/823,619, filed on Mar. 25, 2019.

(51) Int. Cl.
H04W 4/02    (2018.01)

(52) U.S. Cl.
CPC .................... H04W 4/023 (2013.01)

(58) Field of Classification Search
CPC ....... G06F 3/0425; G06F 3/011; H04W 4/023
USPC ...................................... 455/456.1
See application file for complete search history.

(56) References Cited

U.S. PATENT DOCUMENTS

| 4,852,988 A | 8/1989 | Velez |
| 6,433,760 B1 | 8/2002 | Vaissie |
| 6,491,391 B1 | 12/2002 | Blum et al. |
| 6,847,336 B1 | 1/2005 | Lemelson |
| 6,943,754 B2 | 9/2005 | Aughey |

(Continued)

FOREIGN PATENT DOCUMENTS

| CA | 2316473 A1 | 1/2001 |
| CA | 2362895 A1 | 12/2002 |
| CA | 2388766 A1 | 12/2003 |

OTHER PUBLICATIONS

European Search Report mailed Apr. 12, 2022, for EP Application No. 20776591.8, eleven pages.

(Continued)

Primary Examiner — Ahmad F. Matar
Assistant Examiner — Jirapon Tulop
(74) Attorney, Agent, or Firm — Morrison & Foerster LLP

(57) ABSTRACT

Examples of the disclosure describe systems and methods relating to mobile computing. According to an example method, a first user location of a user of a mobile computing system is determined. A first communication device in proximity to the first user location is identified based on the first user location. A first signal is communicated to the first communication device. A first information payload based on the first user location is received from the first communication device, in response to the first communication device receiving the first signal. Video or audio data based on the first information payload is presented to the user at a first time during which the user is at the first user location.

20 Claims, 13 Drawing Sheets

(56) References Cited

U.S. PATENT DOCUMENTS

| | | | |
|---|---|---|---|
| 6,977,776 | B2 | 12/2005 | Volkenandt et al. |
| 7,347,551 | B2 | 3/2008 | Fergason et al. |
| 7,488,294 | B2 | 2/2009 | Torch |
| 7,758,185 | B2 | 7/2010 | Lewis |
| 8,235,529 | B1 | 8/2012 | Raffle |
| 8,353,594 | B2 | 1/2013 | Lewis |
| 8,611,015 | B2 | 12/2013 | Wheeler |
| 8,638,498 | B2 | 1/2014 | Bohn et al. |
| 8,696,113 | B2 | 4/2014 | Lewis |
| 8,733,927 | B1 | 5/2014 | Lewis |
| 8,733,928 | B1 | 5/2014 | Lewis |
| 8,929,589 | B2 | 1/2015 | Publicover et al. |
| 8,968,099 | B1 | 3/2015 | Hanke et al. |
| 9,010,929 | B2 | 4/2015 | Lewis |
| 9,235,064 | B2 | 1/2016 | Lewis |
| 9,239,473 | B2 | 1/2016 | Lewis |
| 9,244,293 | B2 | 1/2016 | Lewis |
| 9,274,338 | B2 | 3/2016 | Robbins et al. |
| 9,292,973 | B2 | 3/2016 | Bar-zeev et al. |
| 9,323,325 | B2 | 4/2016 | Perez et al. |
| 9,658,473 | B2 | 5/2017 | Lewis |
| 9,720,505 | B2 | 8/2017 | Gribetz et al. |
| 10,013,053 | B2 | 7/2018 | Cederlund et al. |
| 10,025,379 | B2 | 7/2018 | Drake et al. |
| 10,151,937 | B2 | 12/2018 | Lewis |
| 10,185,147 | B2 | 1/2019 | Lewis |
| 11,144,960 | B2 * | 10/2021 | Bloy ............... G06F 16/487 |
| 2003/0030597 | A1 | 2/2003 | Geist |
| 2006/0023158 | A1 | 2/2006 | Howell et al. |
| 2011/0211056 | A1 | 9/2011 | Publicover et al. |
| 2011/0213664 | A1 | 9/2011 | Osterhout |
| 2011/0221793 | A1 | 9/2011 | King, III et al. |
| 2012/0021806 | A1 | 1/2012 | Maltz |
| 2013/0077147 | A1 | 3/2013 | Efimov |
| 2013/0083003 | A1 * | 4/2013 | Perez ............... A63F 13/216 |
| | | | 345/419 |
| 2013/0117377 | A1 * | 5/2013 | Miller ............... A63F 13/35 |
| | | | 709/205 |
| 2014/0195918 | A1 | 7/2014 | Friedlander |
| 2015/0168731 | A1 | 6/2015 | Robbins |
| 2017/0178080 | A1 * | 6/2017 | Abebe ............... G06F 16/383 |

OTHER PUBLICATIONS

International Preliminary Report on Patentability and Written Opinion mailed Oct. 7, 2021, for PCT Application No. PCT/US2020/24755, filed Mar. 25, 2020, seven pages.

European Communication dated Jan. 25, 2024, for EP Application No. 20776591.8, six pages.

Japanese Office Action mailed Feb. 16, 2024, for JP Application No. 2021-556756, with English translation, nine pages.

ARToolKit. (Oct. 13, 2005). "Hardware," located at: https://web.archive.org/web/20051013062315/http://www.hitl.washington.edu:80/artoolkit/documentation/hardware.htm, retrieved on Oct. 26, 2020.

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

Azuma, Ronald T. (Feb. 1995). "Predictive Tracking for Augmented Reality," Department of Computer Science, UNC-Chapel Hill, Chapel Hill, NC, 262 pages. (Submit in 2 parts).

Bimber, Oliver et al. (2005). "Spatial Augmented Reality: Merging Real and Virtual Worlds," A. K. Peters, Ltd., Wellesley, MA.

Jacob, R. "Eye Tracking in Advanced Interface Design", Virtual Environments and Advanced Interface Design, Oxford University Press, Inc. (Jun. 1995).

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Chinese Office Action dated May 31, 2024, for CN Application No. 202080024305.X, with English translation, 12 pages.

Japanese Notice of Allowance mailed Jul. 26, 2024, for JP Application No. 2021556756, with English translation, 6 pages.

* cited by examiner

SYSTEMS AND METHODS FOR VIRTUAL AND AUGMENTED REALITY

CROSS REFERENCE TO RELATED APPLICATIONS

This application is a national stage application under 35 U.S.C. § 371 of International Application No. PCT/US2020/024755, filed internationally on Mar. 25, 2020, which claims priority to U.S. Provisional Application No. 63/823,619, filed on Mar. 25, 2019.

FIELD OF THE INVENTION

This invention is related to connected mobile computing systems, methods, and configurations, and more specifically to mobile computing systems, methods, and configurations featuring at least one wearable component which may be utilized for virtual and/or augmented reality operation.

BACKGROUND OF THE INVENTION

It is desirable that mixed reality or augmented reality near-eye displays be lightweight, low-cost, have a small form-factor, have a wide virtual image field of view, and be as transparent as possible. In addition, it is desirable to have configurations that present virtual image information in multiple focal planes (for example, two or more) in order to be practical for a wide variety of use-cases without exceeding an acceptable allowance for vergence-accommodation mismatch. There is a need for compact and persistently connected systems and assemblies which are optimized for use in wearable computing systems.

BRIEF SUMMARY OF THE INVENTION

Examples of the disclosure describe systems and methods relating to mobile computing. According to an example method, a first user location of a user of a mobile computing system is determined. A first communication device in proximity to the first user location is identified based on the first user location. A first signal is communicated to the first communication device. A first information payload based on the first user location is received from the first communication device, in response to the first communication device receiving the first signal. Video or audio data based on the first information payload is presented to the user at a first time during which the user is at the first user location. A second user location of the user is determined. A second communication device in proximity to the second user location is identified based on the second user location. A second signal is communicated to the second communication device. A second information payload based on the second user location is received from the second communication device, in response to the second communication device receiving the second signal. Video or audio data based on the second information payload is presented to the user at a second time during which the user is at the second user location.

DETAILED DESCRIPTION OF THE INVENTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Figure 1:
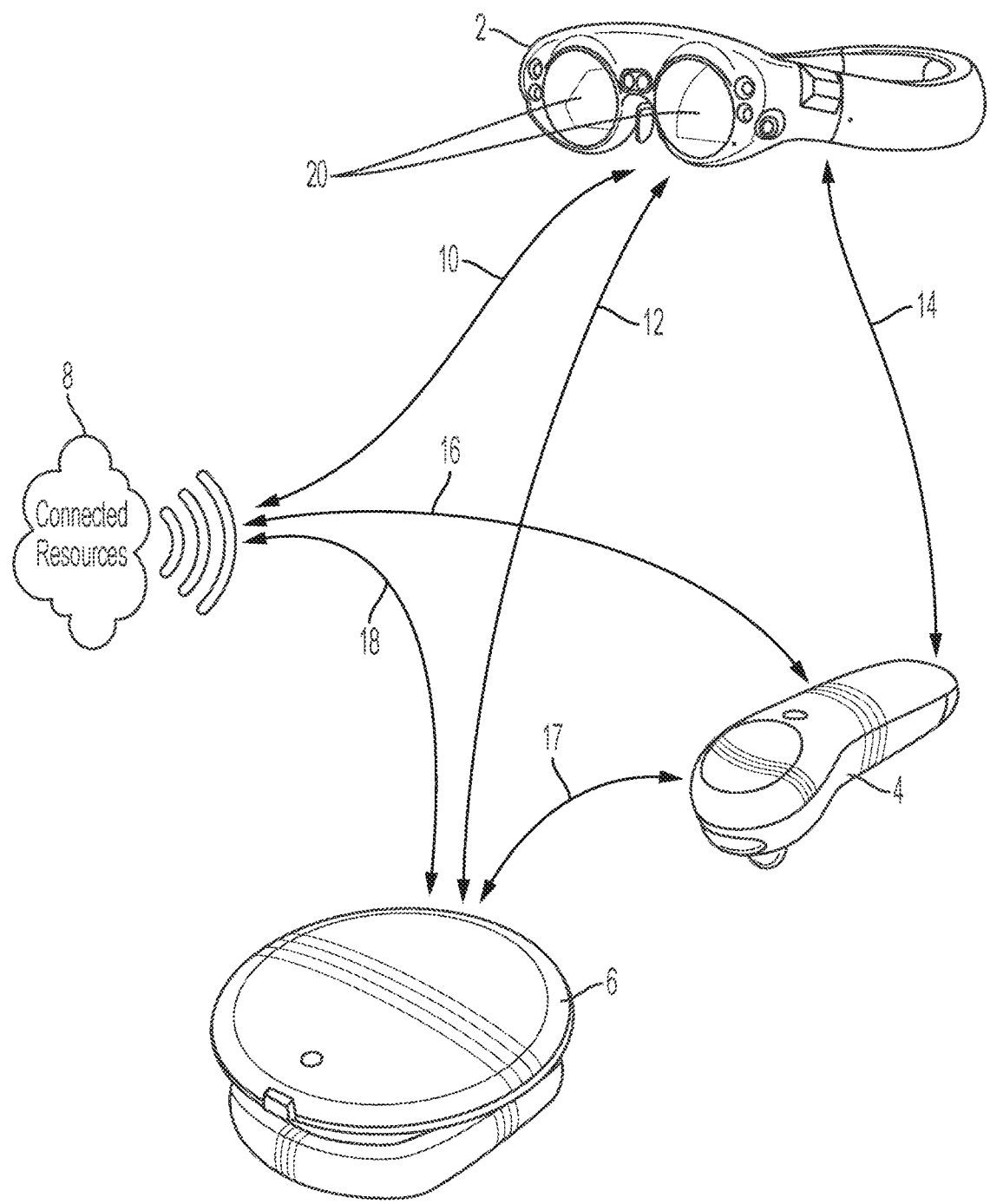
FIG. 1 illustrates an exemplary mobile computing system according to examples of the disclosure.

Referring to FIG. 1, an example mobile computing system, such as a wearable augmented reality system, is illustrated featuring a head-worn viewing component (2), a hand-held controller component (4), and an interconnected auxiliary computing or controller component (6) which may be configured to be worn as a belt pack or the like on the user. Each of these components may be operatively coupled (10, 12, 14, 16, 17, 18) to each other and to other connected resources (8) such as cloud computing or cloud storage resources via wired or wireless communication configurations, such as those specified by IEEE 802.11, Bluetooth®, and other connectivity standards and configurations. Systems such as illustrated in FIG. 1 are described, for example, in U.S. patent application Ser. Nos. 14/555,585, 14/690,401, 14/331,218, 15/481,255, and 62/518,539, each of which is incorporated by reference herein in its entirety. The aforementioned U.S. patent applications describe various aspects of such systems, such as various embodiments of the two depicted optical elements (20), and associated system components and visual components, with which the user may see the world around them (i.e., an environment local to the user) in an augmented reality experience.

Figure 2:
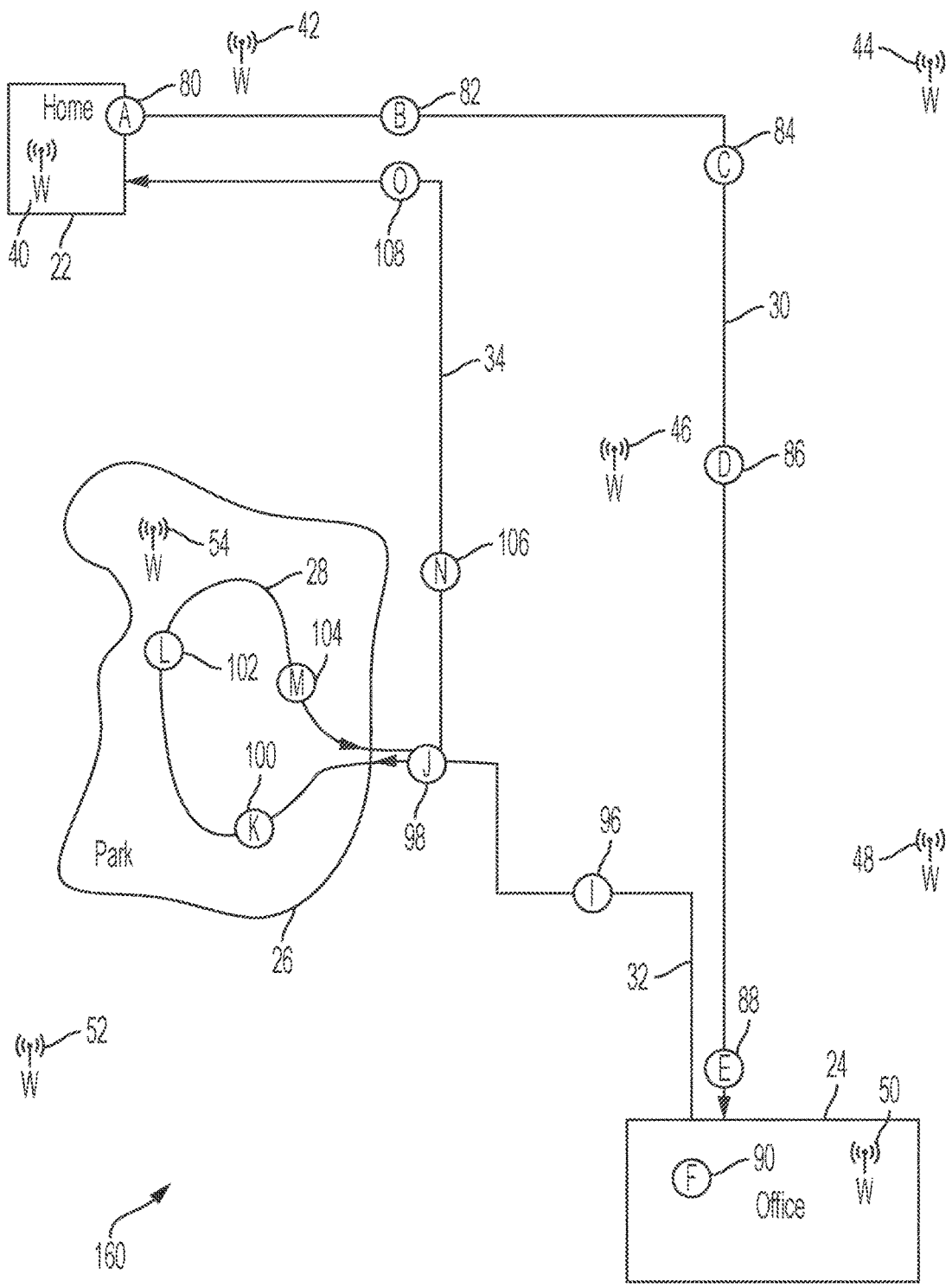
FIG. 2 illustrates an exemplary use case scenario of a mobile computing system according to examples of the disclosure.

Referring to FIG. 2, an example travelling scenario (160) is depicted wherein a user of a mobile computing system, such as the wearable computing system described in reference to FIG. 1, operates in the world. The example of FIG. 2 illustrates a home (22) of the user which features at least one communication device (40), which may be a wireless communication device, configured to connect to the user's mobile computing system. As the user navigates the world around him, here in an illustrative example day wherein the user travels (30) from home (22; point A—80) to work (24; points B—82, C—84, D—86, E—88); then from work (24) he travels (32; points I—96, J—98) to a park (26) for a walk (28; points K—100, L—102, M—104) before the rest of the return (34; points N—106, O—108) to home (22)—along the way coming into wireless contact between his mobile computing system and various wireless devices (40, 42, 44, 46, 48, 50, 52, 54, and others such as shown in magnified views of FIG. 3 and FIG. 4). In some examples, the mobile computing system is configured to utilize various wireless devices and information exchanged therewith to provide the user with a relatively low-latency and robust connectivity experience, generally subject to user preferences (e.g., reflecting preferred tradeoffs between content and quality of service) which may be selected by the user.

Figure 6:
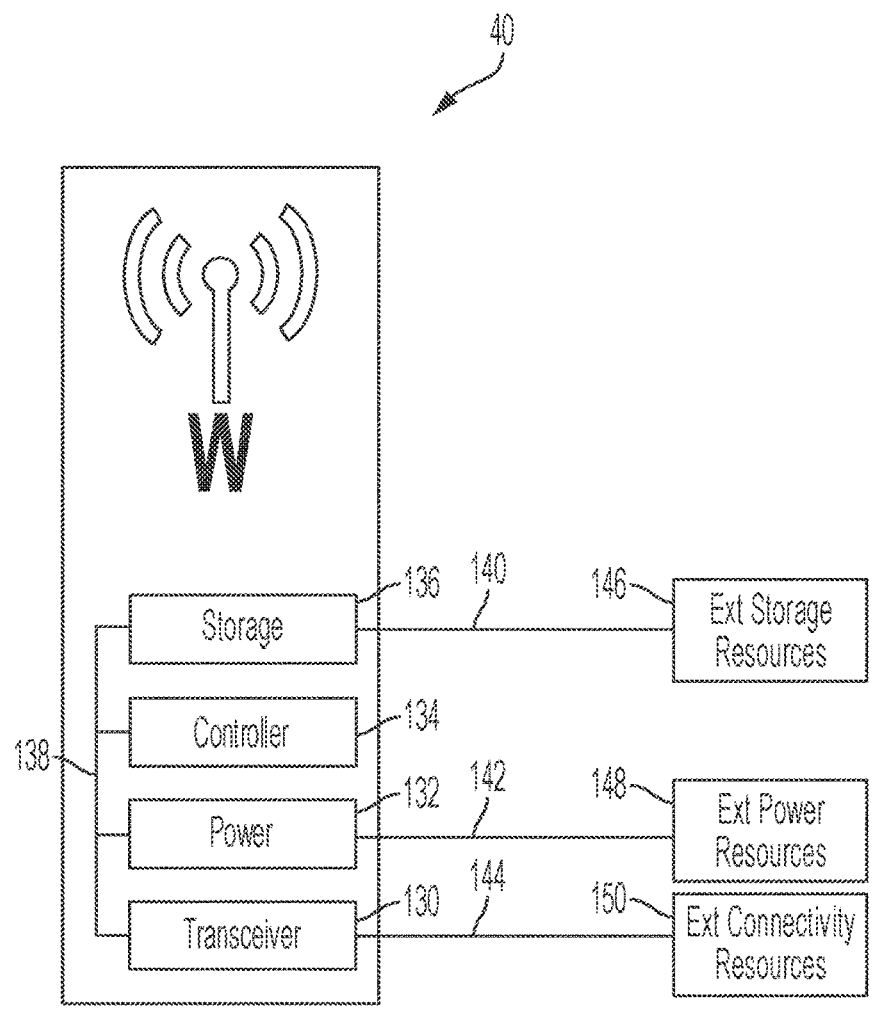
FIG. 6 illustrates an exemplary connected resource according to examples of the disclosure.
Figure 7:
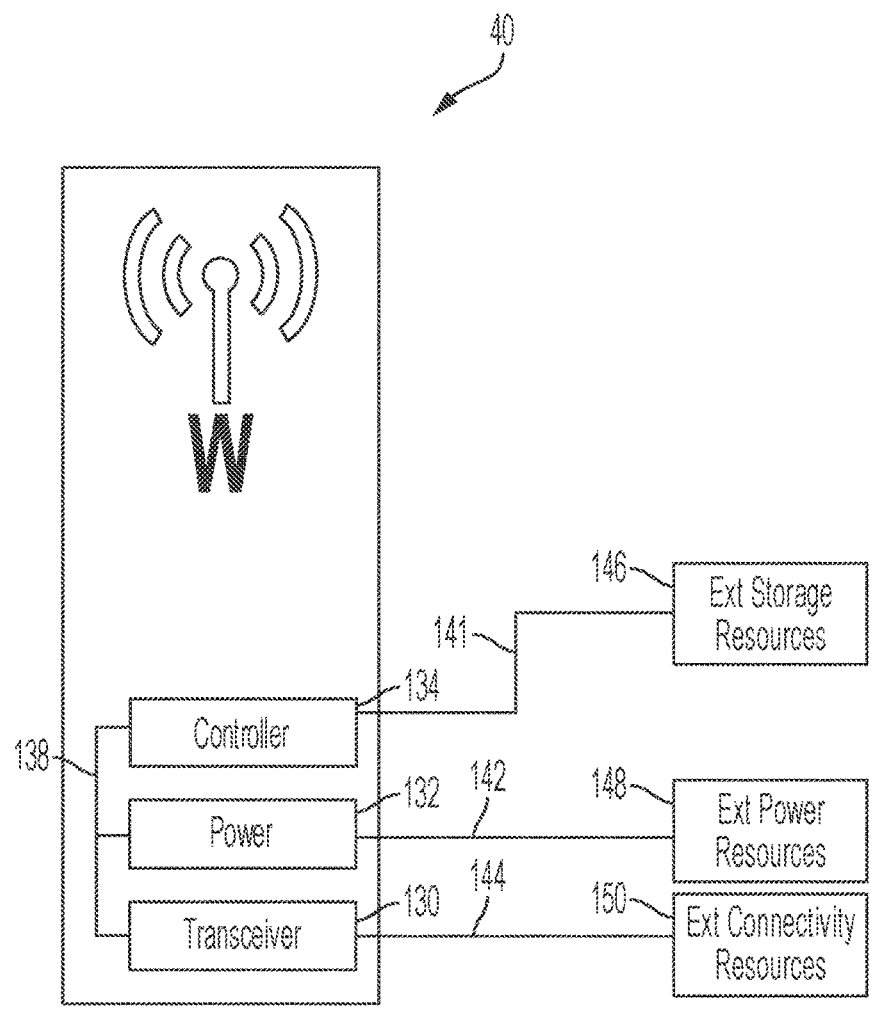
FIG. 7 illustrates an exemplary connected resource according to examples of the disclosure.

In one embodiment, the mobile computing system may be configured such that the user selects certain aspects of his computing experience for the day. For example, through a graphical user interface, voice controls, and/or gestures, the user may input to the mobile computing system that he'll have a typical work day, taking a usual route there and back, and stopping at park for brief walk on the way home. Preferably the mobile computing system can include certain artificial intelligence or machine learning aspects; for example, the system may integrate with the user's electronic calendar to provisionally understand his schedule, subject to quick confirmations. For example, as the user is departing for work, the system may be configured to say or show: "headed to work; usual route and usual computing configuration", and this usual route may be garnered from previous GPS and/or mobile triangulation data through the user's mobile computing system. The "usual computing configuration" may be customized by the user and subject to regulations; for example, the system may be configured to only present certain non-occlusive visuals, no advertisements, and no shopping or other information not pertinent to driving while the user is driving, and to provide an audio version of a news program or current favorite audiobook while the user is driving on his way to work. As the user navigates the drive on the way to work, he may leave connectivity with his home wireless device (40) and enter or maintain connectivity with other wireless devices (42, 44, 46, 48). Each of these wireless devices may be configured to provide the user's mobile computing system with information pertinent to the user's experience at relatively low latency (i.e., by storing locally certain information which may be pertinent to the user at that location). FIGS. 6 and 7 illustrate certain aspects of wireless devices which may be utilized as described herein; the embodiments of FIGS. 8 and 9 feature non-storage beacon and/or marker configurations which also may be utilized to connect directly to locally-pertinent cloud-based information without the benefit of local storage.

For example, as depicted in FIG. 2, at various times as the user travels from point A (80) to point B (82) to point C (84), the user's mobile computing system can identify a nearby communication device in proximity to a location of the user, and engage in communications with that communication device. The communication device may include a wireless communication device. For example, if the user's location is near point C (84), the mobile computing system can determine that communication device (44) is in proximity to the user's location. The communication device (44) may be configured to receive a signal from the user's mobile computing system; and respond to the signal by communicating an information payload to the user's mobile computing system. For example, the information payload passed to the user's mobile system can include spatial information (e.g., geographic or geometric information, such as a mesh describing room geometry) which may be utilized on the user's mobile computing system. Spatial information can be used by the mobile computing system, for example, for highlighting where a trench is being created at the user's location, so that the user clearly visualizes and/or understands the hazard while driving past, and this spatial information (which may feature a highlighted outline or another graphical enhancement of the trench, for example) may be locally stored on the local communication device (44) so that it does not need to be pulled from more remote resources (which may involve greater latency in getting the information to the driver). In addition to lowering latency, local storage also may function to decrease the overall compute load on the user's mobile computing system, because the mobile system may receive information that it otherwise would have had to generate or build itself based upon sensors, for example, which may comprise part of the locally mobile hardware. An information payload provided by the communication device can also include non-spatial information, such as photos, video, audio, text, metadata, or other suitable information; and this information can be used by the user's mobile computing system as appropriate—for instance, by presenting the information to the user visually (e.g., via a transmissive display) and/or aurally (e.g., via one or more speakers).

The information payload can be based on data sent to a communications device by the user's mobile computing system, and/or data sent to the communications device by another user's mobile computing system. That is, for example, data (e.g. spatial coordinates, sensor output, telemetry data) provided by a first mobile computing system at a location can be reused to present an information payload to a second user's mobile computing system that later arrives at the same location.

The user, via his mobile computing system, can communicate with other communication devices at other locations. For example, with respect to FIG. 2, if the user is at location E (88), the mobile computing system can determine that communication device (48) is in proximity to the user's location. The communication device (48) may be configured to receive a signal from the user's mobile computing system; and respond to the signal by communicating an information payload to the user's mobile computing system, such as described above with respect to communication device (44). In some examples, communication devices may be in networked communication and share information with each other. For example, communication device (48) may be in communication with communication device (44) to share information for use in generating an information payload to be transmitted to a user.

Once the user arrives at the parking lot of his work (24), the system may, for example, be configured to detect walking velocity and to be configured by the user to review with the user his schedule for the day, via an integration with his computerized calendaring system, as he is walking up to the office. Certain additional information not resident on his locally mobile computing system may be pulled from local sources (48, 50, for example) which may feature certain storage capacity, to again facilitate smaller mobile overhead and lower latency versus direct cloud connectivity.

Figure 3:
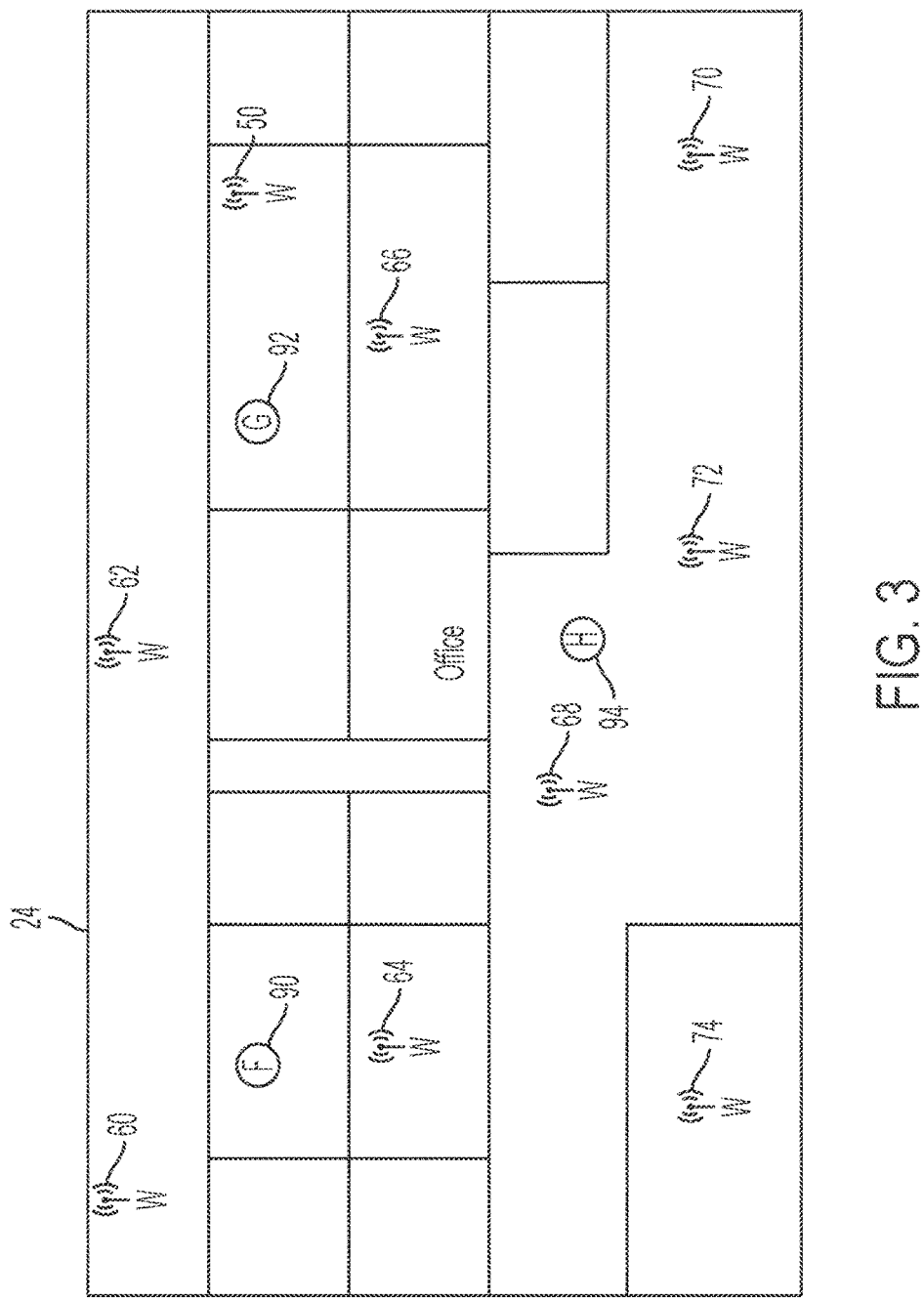
FIG. 3 illustrates an exemplary use case scenario of a mobile computing system according to examples of the disclosure.

Referring to FIG. 3 once in the office (24), the user may connect with a variety of communication devices (50, 60,

62, 64, 66, 68, 70, 72, 74) (which may include wireless communication devices), each of which may be configured to be able to provide location-based information. For example, when at point F (90), the user's mobile computing system may be configured to detect the location (such as by GPS, computer vision, marker or beacon identification, and/or communication device (60, 62, 64) triangulation) and then quickly upload from local storage (i.e., from a communication device 60, 62, 64) to his mobile computing system information pertinent to that location, such as a dense triangular mesh of the geometry of the room, or certain information pertaining to whose office that room is, information about that person, or other information that may be deemed relevant, such as by an artificial intelligence agent working automatically on the user's mobile computing system. Various other communication devices (50, 66, 68, 70, 72, 74) may be positioned in other locations of the office and configured to feature other location-based information, again to provide local users with low-latency and robust mobile computing functionality without everything, such as determination of the room geometry, being done de novo by the sensor facilities local to the mobile computing system in real time.

Figure 4:
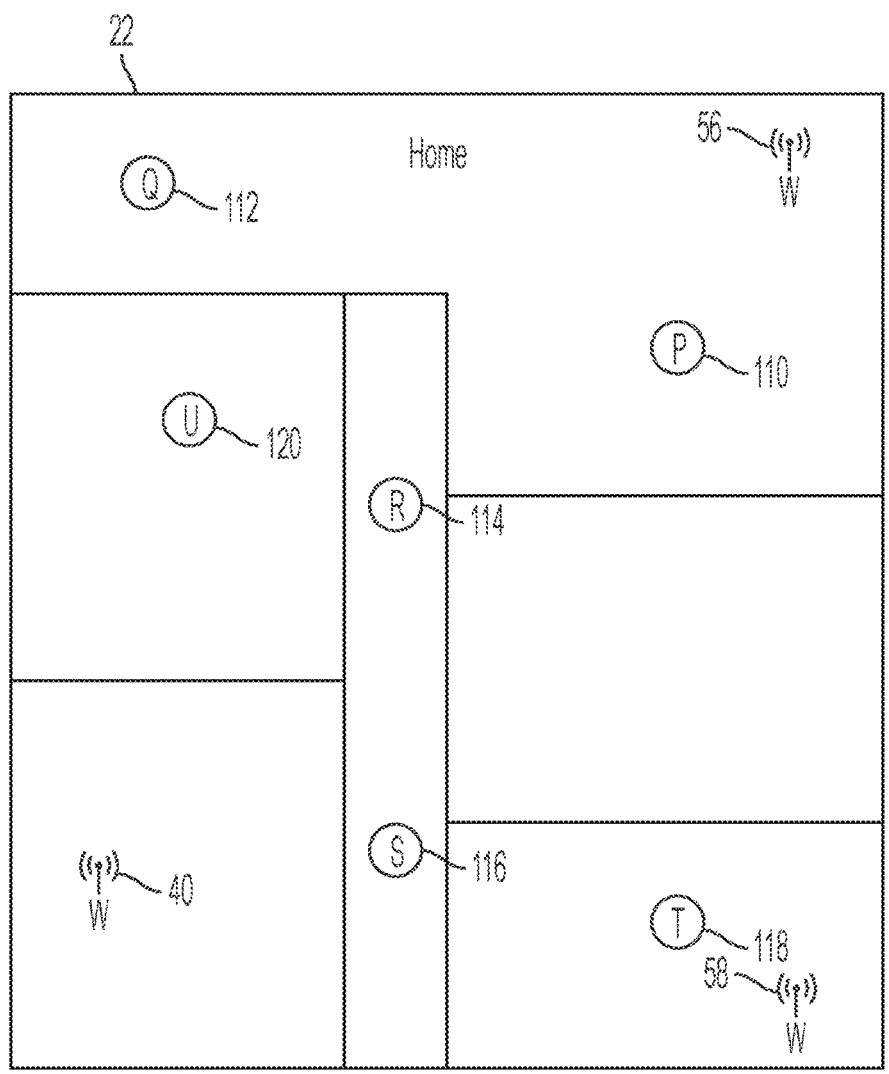
FIG. 4 illustrates an exemplary use case scenario of a mobile computing system according to examples of the disclosure.

Referring to FIG. 4 similar communication device resources (40, 56, 58) may be utilized in the home (22) to assist with location-based information as the user navigates (P—110, Q—112, R—114, S—116, T—118, U—120) the home with his mobile computing system. In the office (24) or home (22) environments, the mobile computing system may be configured to utilize external resources quite differently from driving. For example, an artificial intelligence component of the user's mobile computing system may be aware that the user likes to watch nightly news highlights from the previous week (perhaps in a display manner that would ordinarily not be acceptable when driving, but is acceptable when walking, or perhaps automatically expanding when the user stops walking around and is seated or standing mobile) as he is walking around on Saturday mornings between 7 and 8 am, and so when walking velocity is detected, the system may be configured to deliver such highlights from local storage between those hours, while also gathering other location-based information such as the position of various objects or structures within the house (i.e., to decrease computer vision processing load) in the pertinent location.

Figure 5:
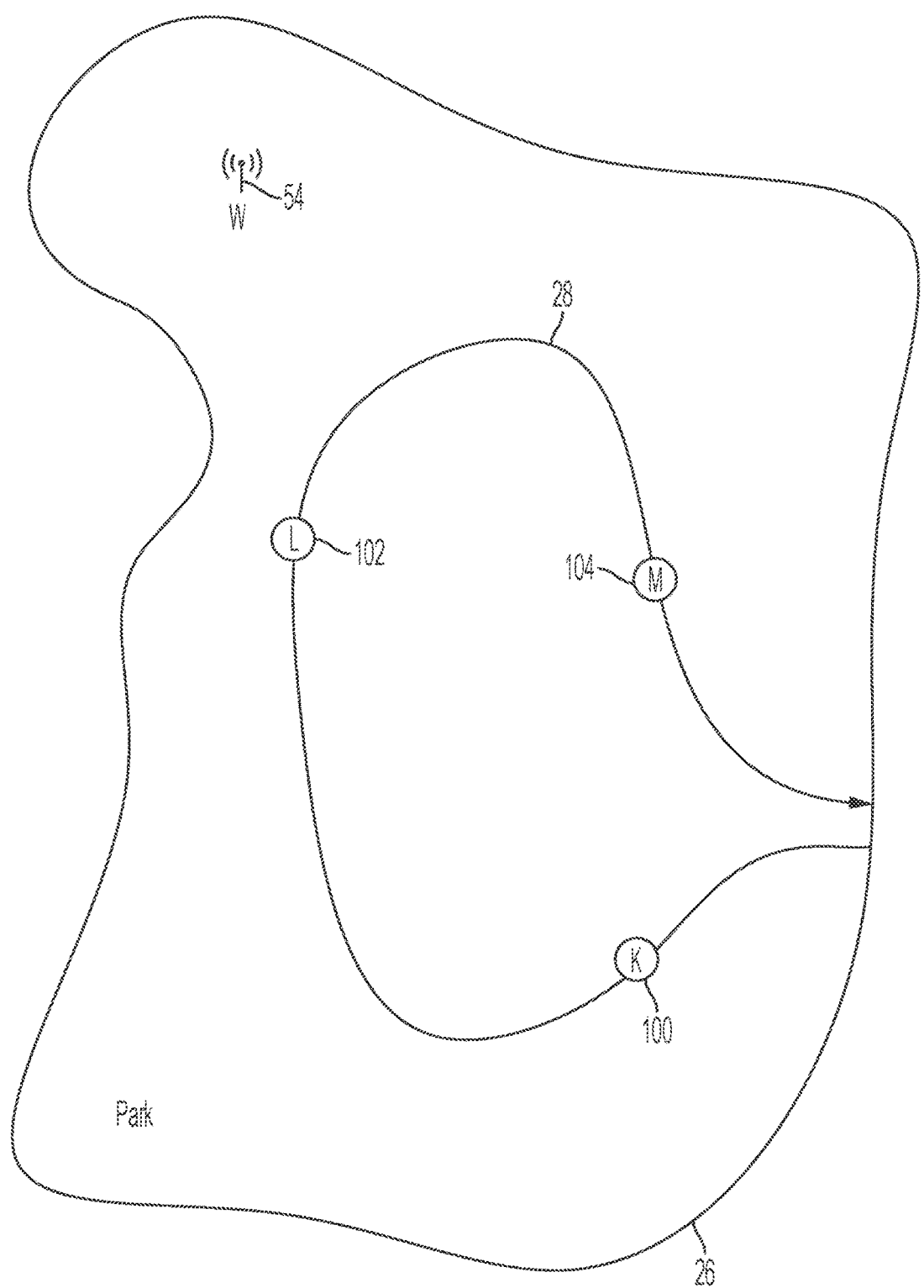
FIG. 5 illustrates an exemplary use case scenario of a mobile computing system according to examples of the disclosure.

Similarly, as the user navigates a walk (28) through the park (26), shown in magnified view in FIG. 5, local wireless device resources (54) may be utilized to provide location-based information, such as background information related to a sculpture garden that the user may be observing as he walks along; such information may be displayed or reproduced as audio as the user is walking around in a manner that is tailored and/or customizable to his walking-in-a-park scenario (i.e., as opposed to driving, or walking around in the home or work).

Referring to FIG. 6, in one embodiment, one of more of the aforementioned communication devices (40, 42, 44, 46, 48, 50, 52, 54, and others as shown in magnified views of FIG. 3 and FIG. 4) may comprise a system as shown in FIG. 6, wherein a local controller (134), such as a processor, is operatively coupled (138) to a power supply (132), such as a battery, a transceiver (130), such as a transmitting and receiving antenna configured to communicate wirelessly with mobile computing systems and other computing systems and resources, such as by using mobile telecom (i.e., GSM, EDGE, HSPA/+, 3G, 4G, 5G), wifi (i.e., 802.11 standards such as 802.11a, 802.11b, 802.11g, 802.11n), WiMax, and/or Bluetooth®; i.e., 1.x, 2.x, 3.x, 4.x) configurations, and a local storage device (136), such as a mass storage or memory device. The storage device (136) may be operatively coupled (140) to external storage resources (146), such as cloud storage resources; the local power supply (132) may be operatively coupled (142) to external power resources (148), such as for long term charging or replenishment; the transceiver (130) may be operatively coupled to external connectivity resources (150) to provide access, for example, to the internet backbone. All of these local and connected resources may be configured based upon the location of such device, to provide local users with information tailored to the local scenario, whether such information is pertinent to traffic, shopping, weather, structures, culture, etc.

FIG. 7 illustrates an embodiment similar to that of FIG. 6, but without local storage facility—the components thereof are operatively coupled (141) to remote storage resources (146), such as cloud resources; such an embodiment as in FIG. 7 maybe utilized in various configurations in place of embodiments such as those in FIG. 6, without the benefit of directly local storage (as described above, such local storage may be beneficial in reducing latency in terms of providing information to a mobile system in the area).

Figure 8:
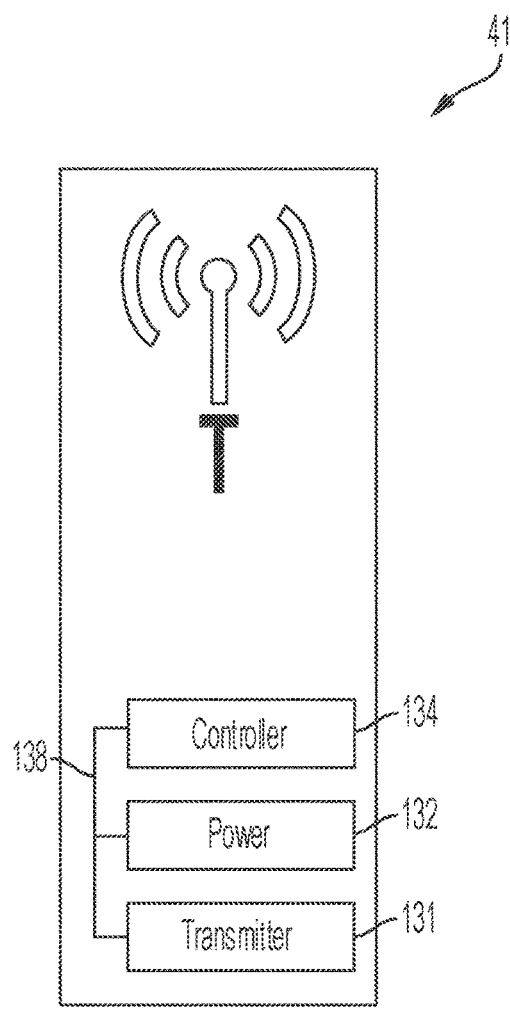
FIG. 8 illustrates an exemplary connected resource according to examples of the disclosure.

Referring to FIG. 8, in further scenarios without local storage capability, a transmitter beacon (41) type of device, for example featuring only a transmitter (131, not a two-way transceiver; such as a transmitting antenna configured to communicate wirelessly with mobile computing systems and other computing systems and resources, such as by using mobile telecom (i.e., GSM, EDGE, HSPA/+, 3G, 4G, 5G), WiFi (i.e., 802.11 standards such as 802.11a, 802.11b, 802.11g, 802.11n), WiMax, and/or Bluetooth®; i.e., 1.x, 2.x, 3.x, 4.x) configurations) and a relatively long-term battery (132), may be utilized to connect to a locally positioned mobile computing device to share location or beacon identification information that functions as a pointer to connect mobile computing system with pertinent cloud resources (i.e., bypassing local storage, but providing information akin to "you are here" pointers to cloud resources that are pertinent).

Figure 9:
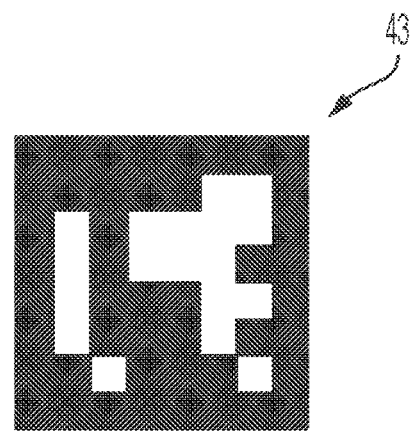
FIG. 9 illustrates an exemplary connected resource according to examples of the disclosure.

Referring to FIG. 9, in a very basic scenario, a non-electronic marker (43), such as an aruco marker, may be utilized to also function as a pointer to connect mobile computing system with pertinent cloud resources (i.e., bypassing local storage, but providing information akin to "you are here" pointers to cloud resources that are pertinent).

As described above, to decrease latency and generally increase useful access to pertinent location-based information, communication devices with localized storage resources, such as those depicted in FIG. 6, may be located throughout the interiors of structures such as homes, enterprises, etc—and also exteriors, such as urban downtown areas, outsides of stores or shops, etc. Similarly, communication devices without localized storage capacity—but operatively coupled to, or pointed to, remote storage resources, also may be located throughout the interiors of structures such as homes, enterprises, etc—and also exteriors, such as urban downtown areas, outsides of stores or shops, etc.

In one embodiment, the mobile computing system may be customizable by the user to present information filtered on a time-domain basis, such as by how old or "stale" such information is. For example, the user may be able to configure the system to only provide traffic information while he is driving that is 10 minutes old or newer, etc. (i.e., the time domain aspect may be customized/configurable); or the user may be able to configure the system to only present architectural (i.e., position of walls within a building) that is 1 year old or newer etc. (i.e., the time domain aspect may be customized/configurable).

Referring to FIGS. 10-13, in various embodiments it is desirable to have a system configured such that position and/or orientation of the user (i.e., via determination of position and/or orientation of a coupled component, such as a head-worn viewing component 2 which is couplable to the head of the user) may be utilized to provide the user with additional and/or enhanced content and/or information that pertains to the user's particular view of the world as he or she navigates the world.

Figure 10:
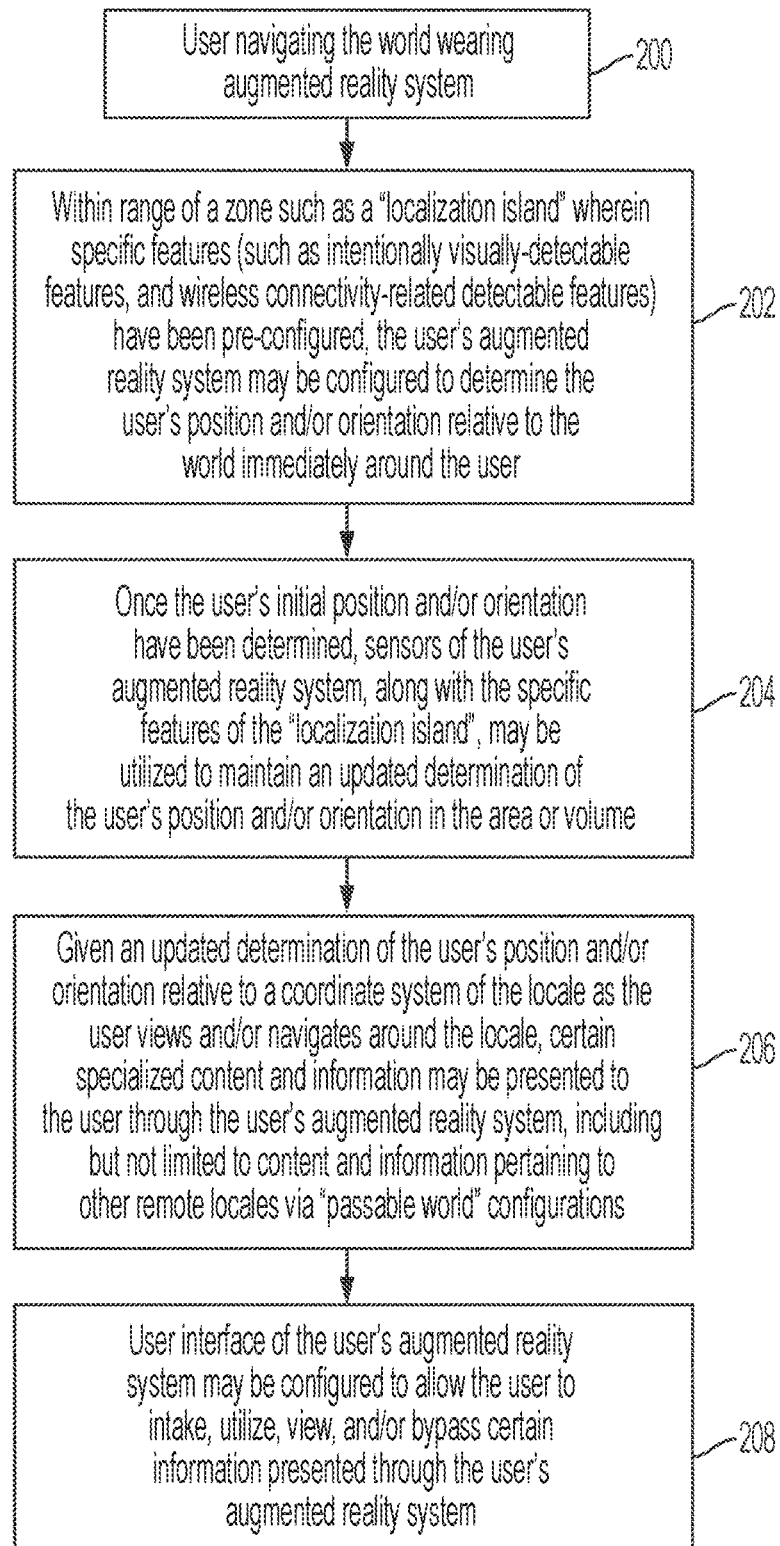
FIG. 10 illustrates an exemplary method of use of a mobile computing system according to examples of the disclosure.

For example, referring to FIG. 10, in one embodiment, a user may be navigating the world wearing an augmented reality system (200) such as that depicted in FIG. 1. The user may enter a zone (such as a walkable area, or functional volume within or outside of a building) wherein specific features, such as intentionally visually-detectable features, and wireless connectivity-related features, have been preconfigured to be located and interpreted by the user's augmented reality system, such that the system is configured to determine the user's position and/or orientation relative to the world immediately around the user. Such a relatively information-rich zone may be termed a "localization island." For example, in one embodiment certain connected resources (8) may comprise wireless connectivity devices, such as 802.11 devices, which may broadcast information such as SSID and/or IP address, and for which relative signal strength may be determined and may be related to proximity; further, other detectable features, such as Bluetooth, audio, and/or infrared beacons with known locations, and/or posters or other visual features with known locations. The combined detection and analysis of these inputs, such as by the plurality of sensors operatively coupled to the head-wearable component (2) of the subject system (which may include components such as monochrome cameras, color cameras, Bluetooth detectors, microphones, depth cameras, stereo-cameras, and the like), may be utilized to determine the position and/or orientation of the user (202) based upon analysis of information pertaining to predetermined or known locations of such items, which may, for example, be contained upon connected resources (8), such as cloud storage systems like those described, for example, in reference to FIG. 6.

Referring again to FIG. 10, once the user's initial position and/or orientation have been determined, sensors of the user's augmented reality system, along with the specific features of the localization island, may be utilized to maintain an updated determination of the user's position and/or orientation in the area or volume (204). Given an updated determination of the user's position and/or orientation relative to a coordinate system of the locale as the user views and/or navigates around the locale, certain specialized content and information may be presented to the user through the user's augmented reality system, including but not limited to content and information pertaining to other remote locales via "passable world" configurations (such as those described, for example, in U.S. patent application Ser. No. 13/663,466, which is incorporated by reference herein in its entirety), which may be configured, for example, to allow other users and objects to virtually "teleport" to different locations to see imagery pertaining to the locale, and/or communicate with others who are there either in reality or virtually (206). A user interface of the user's augmented reality system may be configured to allow the user to intake, utilize, view, and/or bypass certain information presented through the user's augmented reality system. For example, if a user is walking through a particularly identifiable-feature rich (i.e., such as a "localization island") and content rich shopping area but does not want to see any virtual presentation of information pertaining to shopping at the time, the user may configure his or her system to not display such information, and to rather display only information that has been selected for display, such as urgent personal messaging information.

Figure 11:
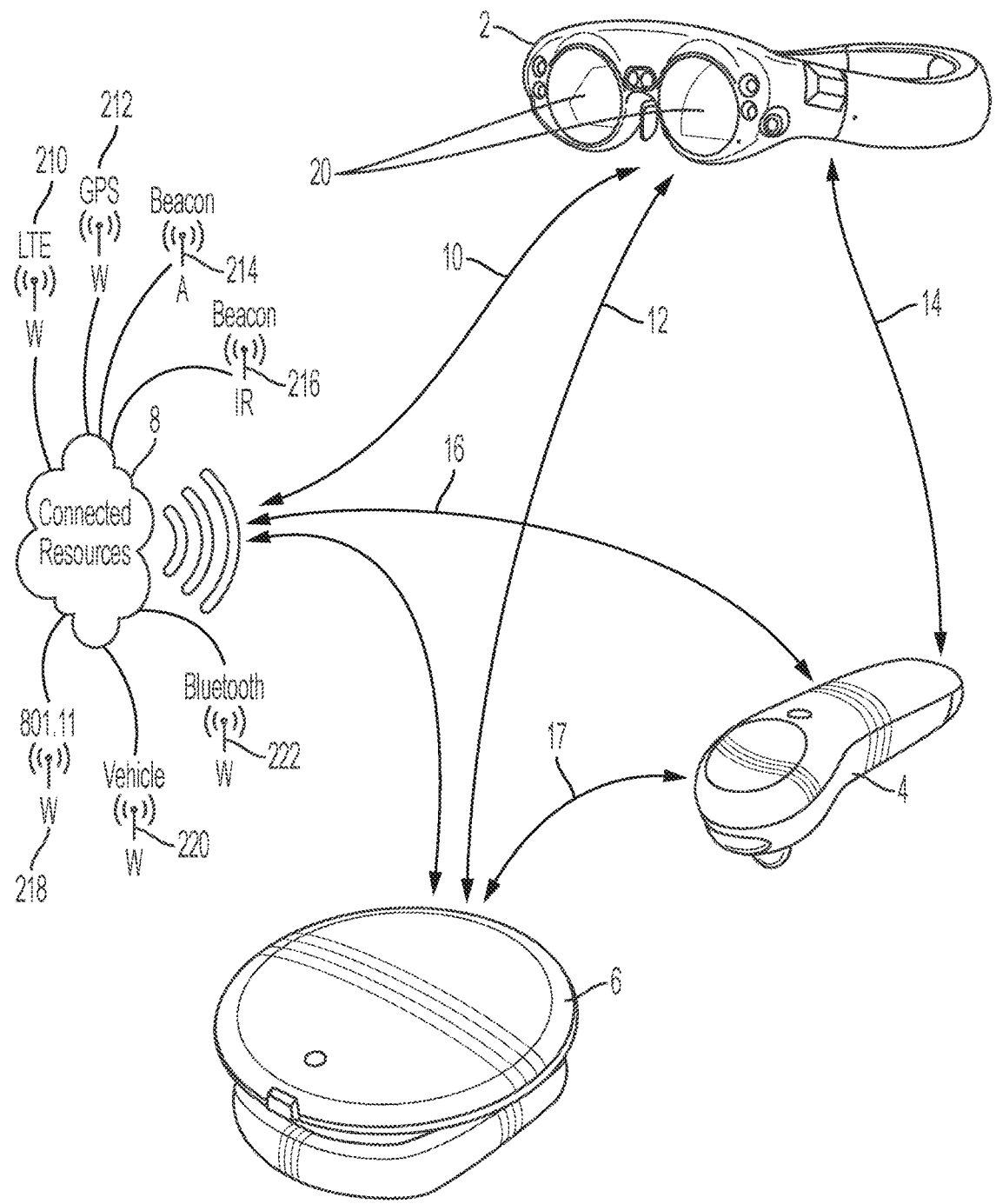
FIG. 11 illustrates an exemplary mobile computing system according to examples of the disclosure.

Referring to FIG. 11, a system similar to that of FIG. 1 is illustrated, but also is shown highlighting several wirelessly connected resources which may be utilized to assist in the localization of the user (i.e., in the determination of position and/or orientation of components such as a head-couplable component 2 which may be coupled to a user's head in operation). For example, referring to FIG. 11, in addition to the main system components (2, 4, 6) being operatively coupled to each other and to connected resources (8) such as cloud storage or cloud computing resources, these system components may be coupleable wirelessly to devices which may assist in the localization of the user, such as Bluetooth devices (222) such as transmitter beacons with known identifications and/or locations; 802.11 devices (218) such as WiFi routers with specific SSID, IP address identifiers, and/or signal strength or proximity sensing and/or transmitting capabilities; vehicles or components thereof (220) which may be configured to transmit information pertaining to velocity, position, and/or orientation (for example, certain speedometer systems within certain motor vehicles may be configured to transmit instantaneous velocity and approximate GPS position through intercoupling with a GPS tracking capable component, such as a vehicle-mounted GPS tracking device; such velocity, position, and/or orientation information pertaining to a vehicle in which a user is located may be utilized, for example, to reduce display "jitter", and also to assist in presenting displayed imagery to users that pertains to real world features that may be seen through vehicle windows, such as labels for summits of mountains being passed by, or other features outside of the vehicle; in certain embodiments involving vehicles or other structures with viewing portals outside of such vehicles or structures, information pertaining to geometry of such vehicles, structures, and/or portals may be utilized, such as from a connected resource 8 cloud repository, to place virtual content appropriately for each user relative to the vehicle or structure); mobile connectivity network transceivers (210), such as those configured for LTE connectivity, which may not only connect a user's system, but also provide for triangulation location and/or orientation integration and also integrated GPS information; GPS transmitters and/or transceivers configured to provide location information to connected devices (212); audio transmitter or transceiver beacons, such as those configured to assist in localizing or directing nearby systems through the use of generally non-audible frequencies (214; for example, in various embodiments, audio transmitters or transceivers may be utilized to assist a mobile system, such as an augmented reality system in minimally-invasively "honing in upon" or locating (i.e., akin to the way in which a first person in the dark could whistle to second person in the dark assisting that second person in finding the first person) not only the audio transmitter or transceiver, but also another adjacent or co-located localization asset such as a light, infrared, RF, or other beacon, transmitter, and/or transceiver (i.e., either automatically through the suite of sensors available on an augmented reality system such as those featured in FIGS. 1 and 11, or in other embodiments manually or semi-automatically, such that an audio transmitter and/or transceiver is represented directionally in the user interface for the user, such as via a visual indicator such as an arrow in the user interface, and/or audio indicator through integrated speakers in the head mounted component); and/or infrared beacons which may be detected by the user's augmented reality system to similarly attract and/or identify information pertaining to location and/or orientation.

Figure 12:
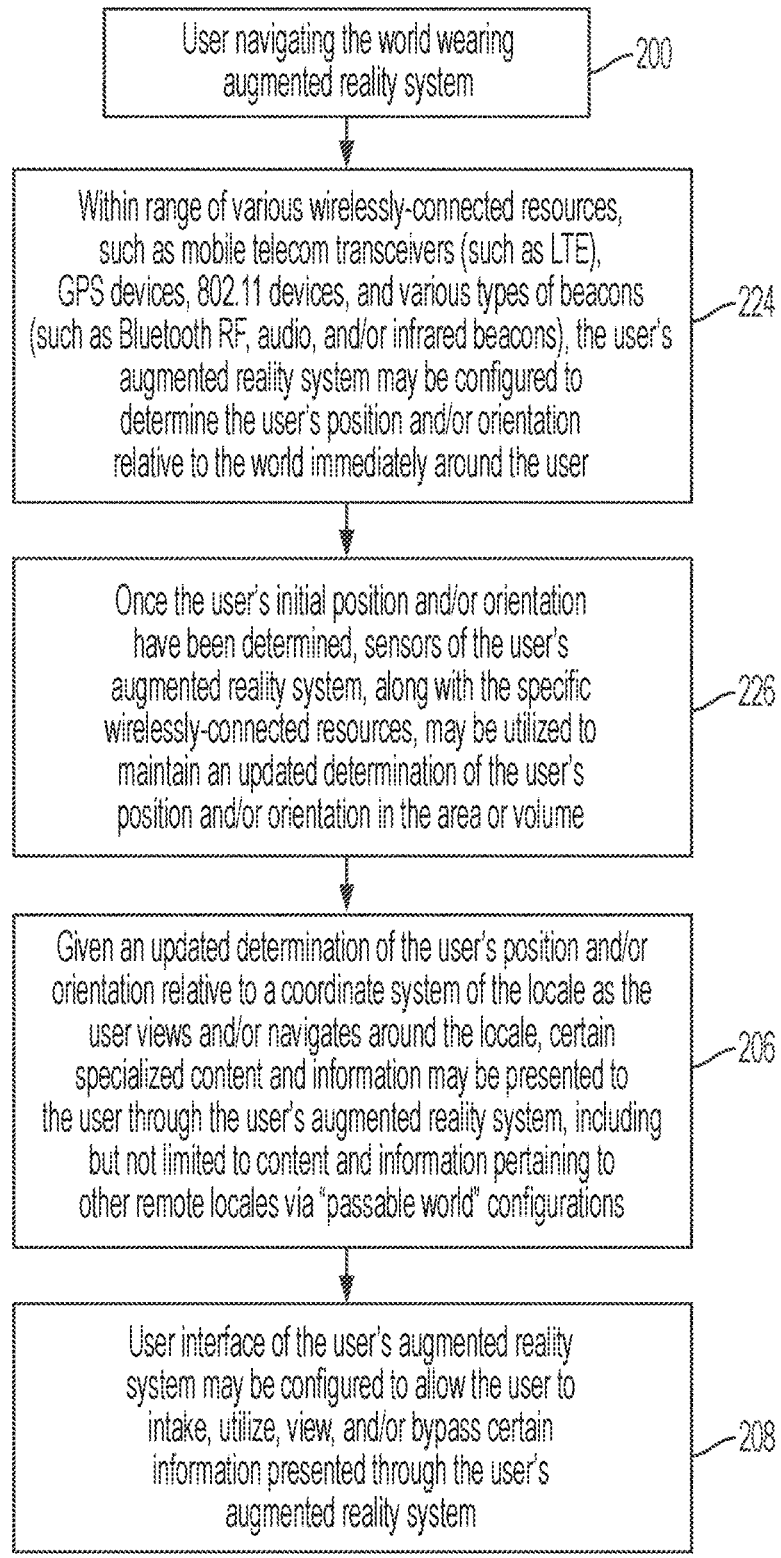
FIG. 12 illustrates an exemplary method of use of a mobile computing system according to examples of the disclosure.

Referring to FIG. 12, an operational embodiment pertaining to a system such as that depicted in FIG. 11 is illustrated. A user navigates the world wearing an augmented reality system (200). Within range of various wirelessly-connected resources, such as mobile telecom transceivers (such as LTE), GPS devices, 802.11 devices, and various types of beacons (such as Bluetooth RF, audio, and/or infrared beacons), the user's augmented reality system may be configured to determine the user's position and/or orientation relative to the world immediately around the user (224). Once the user's initial position and/or orientation have been determined, sensors of the user's augmented reality system, along with the specific wirelessly-connected resources, may be utilized to maintain an updated determination of the user's position and/or orientation in the area or volume (226). Given an updated determination of the user's position and/or orientation relative to a coordinate system of the locale as the user views and/or navigates around the locale, certain specialized content and information may be presented to the user through the user's augmented reality system, including but not limited to content and information pertaining to other remote locales via "passable world" configurations (such as those described, for example, in U.S. patent application Ser. No. 13/663,466, which is incorporated by reference herein in its entirety), which may be configured, for example, to allow other users and objects to virtually "teleport" to different locations to see imagery pertaining to the locale, and/or communicate with others who are there either in reality or virtually (206). A user interface of the user's augmented reality system may be configured to allow the user to intake, utilize, view, and/or bypass certain information presented through the user's augmented reality system (208), as described for example, above in relation to FIG. 10.

Figure 13:
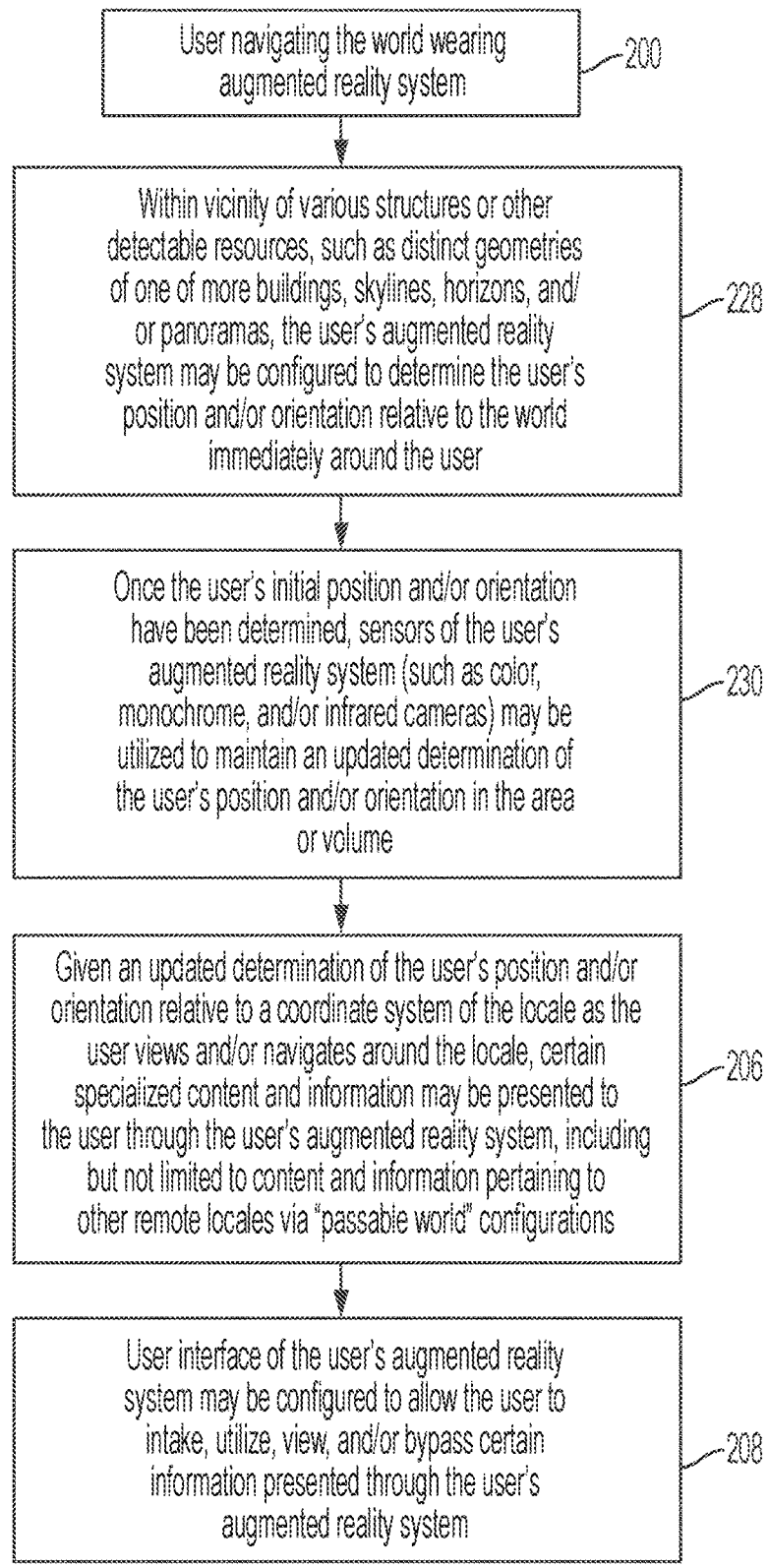
FIG. 13 illustrates an exemplary method of use of a mobile computing system according to examples of the disclosure.

Referring to FIG. 13, in another embodiment other detectable resources such as distinct geometries of buildings, skylines, horizons, and/or panoramas may be analyzed, such as via computer vision and/or image or feature processing techniques, utilizing connected systems and resources such as those depicted in FIGS. 1 and 11 to determine a user's position and/or orientation. Referring to FIG. 13, a user navigates the world wearing an augmented reality system (200). Within vicinity of various structures or other detectable resources, such as distinct geometries of one of more buildings, skylines, horizons, and/or panoramas, the user's augmented reality system may be configured to determine the user's position and/or orientation relative to the world immediately around the user by processing, thresholding, and/or comparing aspects of such images with known imagery pertaining to such scenes or resources (228). Once the user's initial position and/or orientation have been determined, sensors of the user's augmented reality system (such as color, monochrome, and/or infrared cameras) may be utilized to maintain an updated determination of the user's position and/or orientation in the area or volume (230). Given an updated determination of the user's position and/or orientation relative to a coordinate system of the locale as the user views and/or navigates around the locale, certain specialized content and information may be presented to the user through the user's augmented reality system, including but not limited to content and information pertaining to other remote locales via "passable world" configurations (such as those described, for example, in U.S. patent application Ser. No. 13/663,466, which is incorporated by reference herein in its entirety), which may be configured, for example, to allow other users and objects to virtually "teleport" to different locations to see imagery pertaining to the locale, and/or communicate with others who are there either in reality or virtually (206). A user interface of the user's augmented reality system may be configured to allow the user to intake, utilize, view, and/or bypass certain information presented through the user's augmented reality system (208), as described for example, above in relation to FIG. 10.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method comprising:
   determining a first user location of a user of a first mobile computing system;
   identifying, based on the first user location, a first communication device in proximity to the first user location;
   communicating a first signal to the first communication device;
   receiving, from the first communication device in response to the first communication device receiving the first signal, a first information payload based on the first user location, wherein the first information payload is generated based on:
      data received by the first communication device from a second mobile computing system,
      first attributes associated with the first user location, the first attributes determined via the first communication device, and
      a first activity of the user at the first user location, the first activity determined via the first mobile computing system;
   presenting, to the user, at a first time during which the user is at the first user location, video or audio data based on the first information payload;
   determining a second user location of the user;
   identifying, based on the second user location, a second communication device in proximity to the second user location;
   communicating a second signal to the second communication device;
   receiving, from the second communication device in response to the second communication device receiving the second signal, a second information payload based on the second user location, wherein the second information payload is generated based on:
      second attributes associated with the second user location, the second attributes determined via the second communication device, and
      a second activity of the user at the second user location, the second activity determined via the first mobile computing system; and
   presenting, to the user, at a second time during which the user is at the second user location, video or audio data based on the second information payload.

2. The method of claim 1, wherein the first mobile computing system comprises a wearable head device and said presenting video or audio data to the user comprises presenting video or audio data to the user via the wearable head device.

3. The method of claim 1, wherein the first communication device comprises a first wireless communication device and the second communication device comprises a second wireless communication device.

4. The method of claim 1, wherein the second communication device is in communication with the first communication device.

5. The method of claim 1, wherein:
   the first communication device comprises a first local storage, and
   in response to receiving the first signal, data based on the first signal is stored in the first local storage.

6. The method of claim 1, wherein:
   the first communication device comprises a first local storage, and
   the first information payload is generated based on data stored in the first local storage.

7. The method of claim 1, wherein data based on the first signal is communicated to a remote server by the first communication device in response to receiving the first signal.

8. The method of claim 1, wherein the first information payload is generated based on data received from a remote server.

9. The method of claim 1, wherein the mobile computing system comprises one or more sensors, and the first signal is based on an output of the one or more sensors.

10. The method of claim 1, wherein the mobile computing system comprises one or more sensors, and said determining the first user location comprises determining the first user location based on an output of the one or more sensors.

11. The method of claim 1, wherein said determining the first user location comprises determining the first user location based on a schedule determined by one or more machine learning techniques.

12. The method of claim 1, wherein said determining the first user location comprises determining the first user location based on a schedule input by the user.

13. The method of claim 1, wherein the mobile computing system comprises one or more sensors, and the first activity is determined via the one or more sensors.

14. The method of claim 1, wherein the mobile computing system comprises one or more sensors, and the second activity is determined via the one or more sensors.

15. A mobile computing system comprising:
   one or more sensors; and
   one or more processors configured to perform a method comprising:
      determining, based on an output of the one or more sensors, a first user location of a user of the mobile computing system;
      identifying, based on the first user location, a first communication device in proximity to the first user location;
      communicating a first signal to the first communication device;

receiving, from the first communication device in response to the first communication device receiving the first signal, a first information payload based on the first user location, wherein the first information payload is generated based on:
    data received by the first communication device from a second mobile computing system,
    first attributes associated with the first user location, the first attributes determined via the first communication device, and
    a first activity of the user at the first user location, the first activity determined via the first mobile computing system;
presenting, to the user, at a first time during which the user is at the first user location, video or audio data based on the first information payload;
determining a second user location of the user;
identifying, based on the second user location, a second communication device in proximity to the second user location;
communicating a second signal to the second communication device;
receiving, from the second communication device in response to the second communication device receiving the second signal, a second information payload based on the second user location, wherein the second information payload is generated based on:
    second attributes associated with the second user location, the second attributes determined via the second communication device, and
    a second activity of the user at the second user location, the second activity determined via the first mobile computing system; and
presenting, to the user, at a second time during which the user is at the second user location, video or audio data based on the second information payload.

16. The mobile computing system of claim 15, wherein the mobile computing system comprises a wearable head device and said presenting video or audio data to the user comprises presenting video or audio data to the user via the wearable head device.

17. The mobile computing system of claim 15, wherein:
the first communication device comprises a first local storage, and
in response to receiving the first signal, data based on the first signal is stored in the first local storage.

18. The mobile computing system of claim 15, wherein:
the first communication device comprises a first local storage, and
the first information payload is generated based on data stored in the first local storage.

19. The mobile computing system of claim 15, wherein data based on the first signal is communicated to a remote server by the first communication device in response to receiving the first signal.

20. A non-transitory computer-readable medium storing instructions, which when executed by one or more processors cause the one or more processors to perform a method comprising:
determining a first user location of a user of a first mobile computing system;
identifying, based on the first user location, a first communication device in proximity to the first user location;
communicating a first signal to the first communication device;
receiving, from the first communication device in response to the first communication device receiving the first signal, a first information payload based on the first user location, wherein the first information payload is generated based on:
    data received by the first communication device from a second mobile computing system, first attributes associated with the first user location, the first attributes determined via the first communication device, and
    a first activity of the user at the first user location, the first activity determined via the first mobile computing system;
presenting, to the user, at a first time during which the user is at the first user location, video or audio data based on the first information payload;
determining a second user location of the user;
identifying, based on the second user location, a second communication device in proximity to the second user location;
communicating a second signal to the second communication device;
receiving, from the second communication device in response to the second communication device receiving the second signal, a second information payload based on the second user location, wherein the second information payload is generated based on:
    second attributes associated with the second user location, the second attributes determined via the second communication device, and
    a second activity of the user at the second user location, the second activity determined via the first mobile computing system; and
presenting, to the user, at a second time during which the user is at the second user location, video or audio data based on the second information payload.

* * * * *

UNITED STATES PATENT AND TRADEMARK OFFICE
CERTIFICATE OF CORRECTION

PATENT NO. : 12,245,097 B2
APPLICATION NO. : 17/598207
DATED : March 4, 2025
INVENTOR(S) : Randall E. Hand It is certified that error appears in the above-identified patent and that said Letters Patent is hereby corrected as shown below:

In the Specification
At Column 1, Line number 10, delete "63/823,619," and insert -- 62/823,619, --.

Signed and Sealed this
Thirteenth Day of May, 2025

Coke Morgan Stewart
*Acting Director of the United States Patent and Trademark Office*